United States Patent
Chiu

(10) Patent No.: US 9,010,780 B1
(45) Date of Patent: Apr. 21, 2015

(54) SCOOTER

(71) Applicant: Fran Wheel Enterprise Co., Ltd., Taichung (TW)

(72) Inventor: Ping-Jan Chiu, Taichung (TW)

(73) Assignee: Fran Wheel Enterprise Co., Ltd., Taichung (TW)

( * ) Notice: Subject to any disclaimer, the term of this patent is extended or adjusted under 35 U.S.C. 154(b) by 0 days.

(21) Appl. No.: 14/445,235

(22) Filed: Jul. 29, 2014

(30) Foreign Application Priority Data

May 7, 2014 (TW) .............................. 103116254 A

(51) Int. Cl.
*B60M 1/00* (2006.01)
*B62K 13/00* (2006.01)
*B62L 1/04* (2006.01)
*B62J 1/08* (2006.01)

(52) U.S. Cl.
CPC . *B62K 13/00* (2013.01); *B62L 1/04* (2013.01); *B62J 1/08* (2013.01)

(58) Field of Classification Search
USPC ......... 280/7.1, 7.11, 220, 259–261, 240, 278, 280/287
See application file for complete search history.

(56) References Cited

U.S. PATENT DOCUMENTS 6,581,949 B2 * 6/2003 Lopez ........................... 280/278
7,044,488 B1 * 5/2006 Hamend ....................... 280/221

* cited by examiner

*Primary Examiner* — John Walters
*Assistant Examiner* — James Triggs
(74) *Attorney, Agent, or Firm* — Trop Pruner & Hu, P.C.

(57) ABSTRACT

A scooter includes a frame body, a handle unit, and a wheel unit. The frame body includes a main member formed with an accommodating space, a seat-connecting rod, and a front member connected to a front end of the main member. The seat-connecting rod has a front end connected to the main member. The seat-connecting rod is pivotable relative to the main member between a retracted position to be accommodated in the accommodating space, and an expanded position, where a rear end of the seat-connecting rod is away from the accommodating space for being coupled to a seat. The handle unit includes a front fork connected to the front member. The wheel unit includes a front wheel mounted to the front fork, and at least one rear wheel mounted to the main member.

8 Claims, 8 Drawing Sheets

SCOOTER

BACKGROUND OF THE INVENTION

1. Field of the Invention

This invention relates to a man-powered vehicle, more particularly to a scooter.

2. Description of the Related Art

Taiwanese Utility Model Patent No. M436632 (Application No. 101208299) discloses a conventional scooter. A rider steers the conventional scooter in a standing position on a deck thereof and kicks against the floor with one leg to move forward. However, this conventional scooter is not suitable for long term usage which would cause fatigue of the rider.

Taiwanese Design Patent No. D142272 (Application No. 099304562) discloses a balance bike. A child sits on a seat of the balance bike and uses his/her legs to kick against the floor to move forward, thereby allowing the child to learn walking or to play. However, such balance bike requires a relatively large storage space.

SUMMARY OF THE INVENTION

Therefore, the object of the present invention is to provide a scooter that is convertible as a kick scooter or a balance bike.

According to the present invention, a scooter includes a frame body, a handle unit and a wheel unit. The frame body includes a main member that is formed with an accommodating space, a seat-connecting rod, and a front member that is connected to a front end of the main member. The seat-connecting rod has a front end connected pivotally to the main member, and a rear end opposite to the front end. The seat-connecting rod is pivotable relative to the main member between a retracted position accommodated in the accommodating space, and an expanded position, where the rear end of the seat-connecting rod is away from the accommodating space and is adapted to be coupled to a seat. The handle unit includes a front fork rotatably connected to the front member of the frame body, and a handle member connected to a top end of the front fork. The wheel unit includes a front wheel mounted rotatably to the front fork of the handle unit, and at least one rear wheel mounted rotatably to the main member of the frame body and being away from the front wheel.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
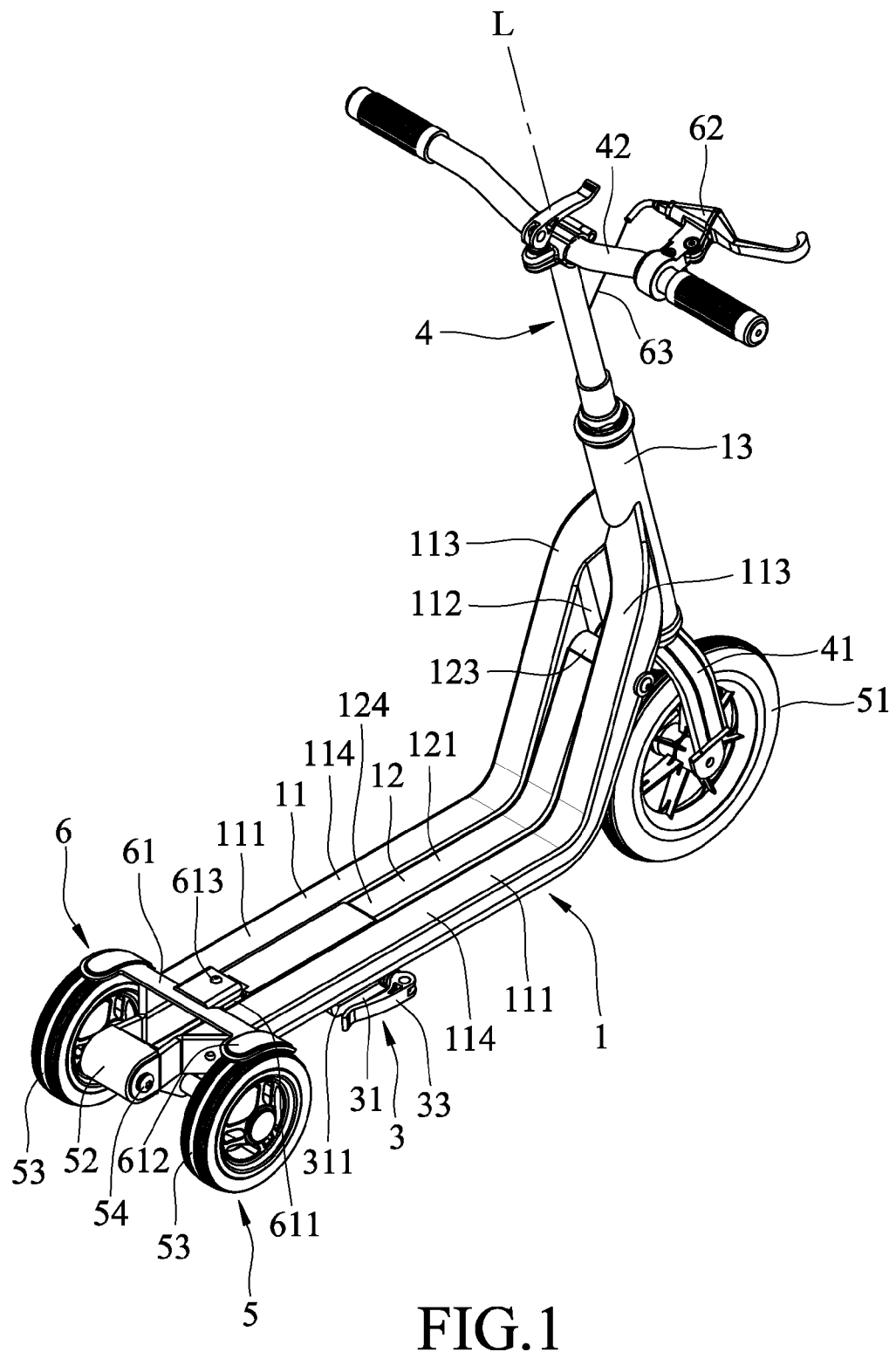
FIG. 1 is a perspective view of the preferred embodiment of a scooter according to the present invention with a seat-connecting rod in a retracted position.
Figure 2:
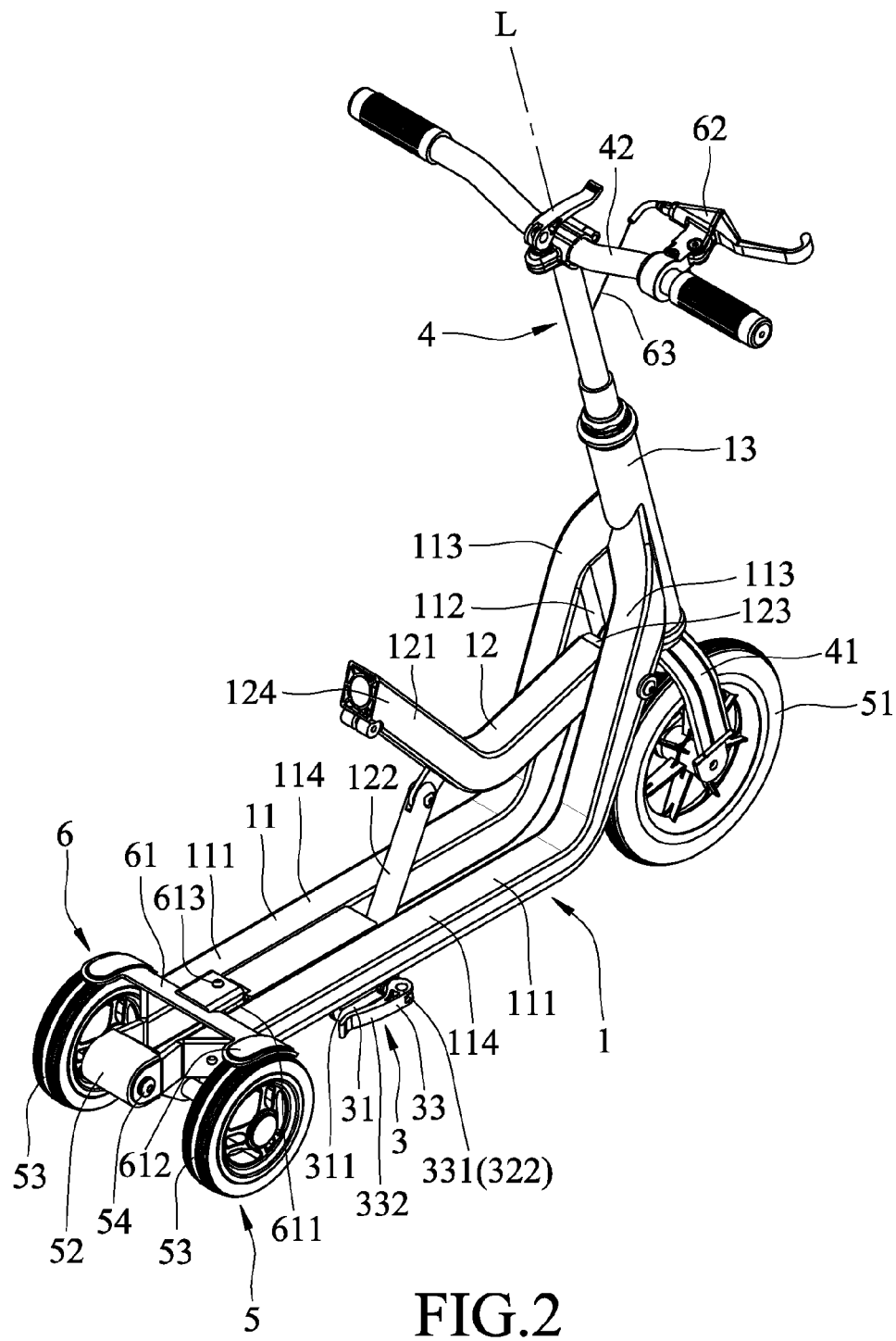
FIG. 2 is another perspective view of the preferred embodiment with the seat-connecting rod in an expanded position.
Figure 3:
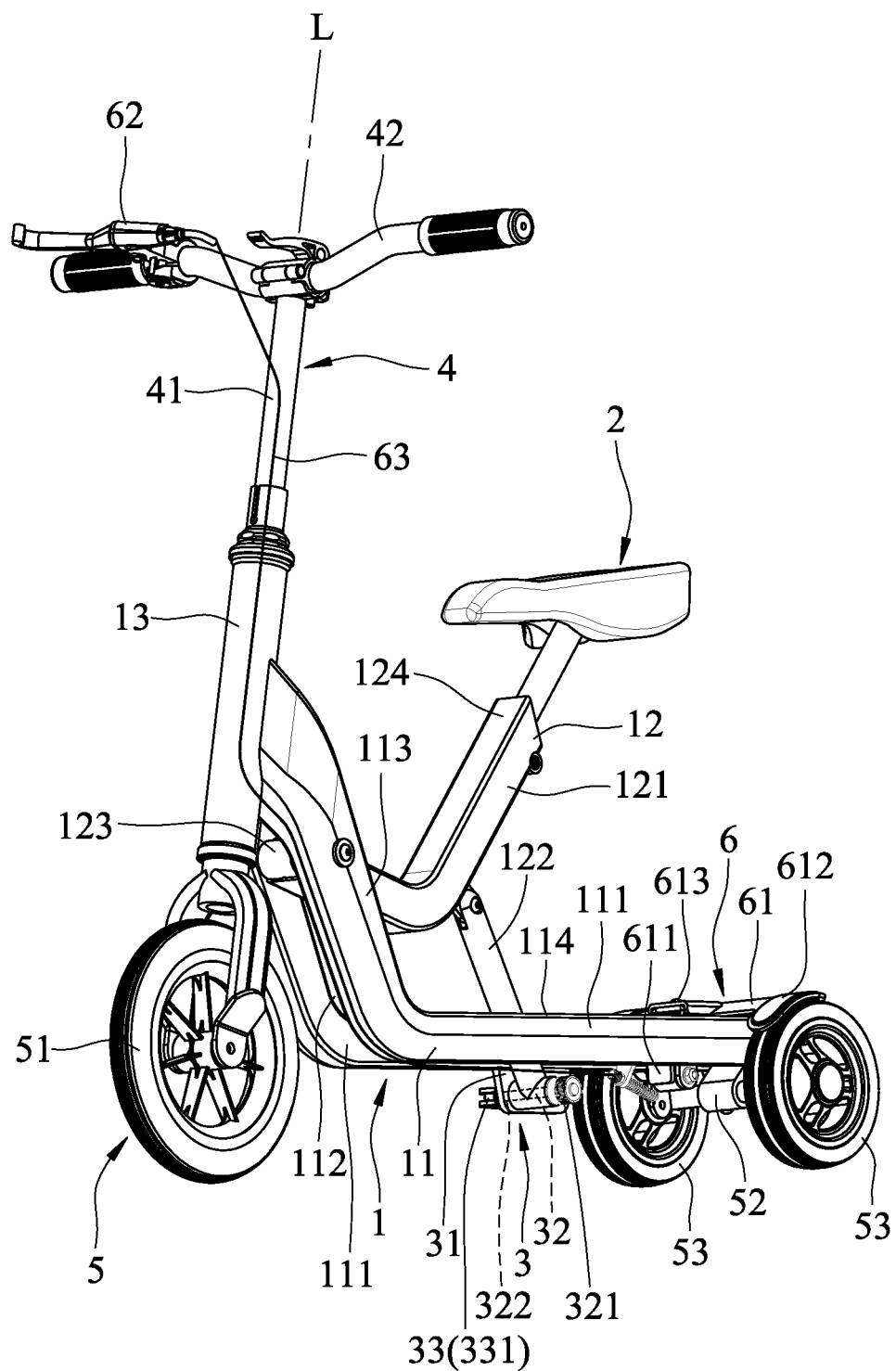
FIG. 3 is another perspective view of the preferred embodiment with the seat-connecting rod in an expanded position and with a seat connected to the seat-connecting rod.

Referring to FIGS. 1, 2 and 3, a preferred embodiment of a scooter according to the present invention includes a frame body 1, a locking unit 3, a handle unit 4, a wheel unit 5 and a brake unit 6.

The frame body 1 includes a main member 11, a movable member 12 connected pivotally to the main member 11, and a front member 13 connected to a front end of the main member 11. In this embodiment, the frame body 1 is made of, but not limited to, aluminum alloy which has a light weight and a high material strength.

The main member 11 includes a pair of lateral rods 111 connected to the front member 13 and defining an accommodating space 112 therebetween. Each of the lateral rods 111 has a connecting portion 113 extending downwardly and rearwardly from the front member 13, and a deck portion 114 extending rearwardly from a distal end of the connecting portion 113.

The movable member 12 includes a seat-connecting rod 121 and a support rod 122. The seat-connecting rod 121 is V-shaped, and has a front end 123 connected pivotally to the connecting portions 113 of the lateral rods 111 of the main member 11, and a rear end 124 opposite to the front end 123. The support rod 122 has one end connected pivotally between the deck portions 114 of the lateral rods 111, and an opposite end coupled pivotally to the seat-connecting rod 121 at a position close to the rear end 124 of the seat-connecting rod 121.

The seat-connecting rod 121 is pivotable relative to the main member 11 between a retracted position (see FIG. 1), where the seat-connecting rod 121 and the support rod 122 (not visible in FIG. 1) are accommodated in the accommodating space 112, and an expanded position (see FIG. 2), where the rear end 124 of the seat-connecting rod 121 is away from the accommodating space 112 and where the opposite end of the support rod 122 is away from the accommodating space 112 and supports the seat-connecting rod 121.

The locking unit 3 is mounted to the frame body 1 for locking the seat-connecting rod 121 at one of the retracted position and the expanded position. The locking unit 3 includes a locking component 31 mounted to one of the lateral rods 111 and formed with an engaging groove 311, a pivot rod 32 (see FIG. 3) extending through the engaging groove 311 in a left-right direction transverse to the deck portions 114 of the lateral rods 111 and connected pivotally to the support rod 122, a pull rod 33 connected pivotally to the pivot rod 32 and disposed adjacent to the locking component 31, and a washer 34 disposed between the locking component 31 and the pull rod 33.

The pivot rod 32 has a locking section 321 connected pivotally to the support rod 122, and a coupling section 322 extending through the engaging groove 311.

The pull rod 33 has a cam portion 331 connected to the coupling section 322 of the pivot rod 32, and an access portion 332 distal from the cam portion 331. The pull rod 33 is pivotable relative to the pivot rod 32 between a locking position (see FIGS. 1, 2, 3 and 6) and an unlocking position (see FIG. 7).

When the pull rod 33 is in the locking position, the access portion 332 is close to the locking component 31, and the cam portion 331 tightly presses the washer 34 to abut against the locking component 31. The pivot rod 32 is then tightened, and the locking section 321 of the pivot rod 32 abuts against the support rod 122, so that the support rod 122 is locked and not allowed to pivot relative to the lateral rods 111. When the pull rod 33 is in the unlocking position, the access portion 332 is away from the locking component 31, and the cam portion 331 releases the washer 34, thereby loosening the pivot rod 32 and allowing pivot movement of the support rod 122 relative to the lateral rods 111. In use, the pull rod 33 has to be switched from the locking position to the unlocking position before the seat-connecting rod 121 is converted between the retracted position and the expanded position, and be moved back to the locking position after the abovementioned conversion of the seat-connecting rod 121 so as to lock the seat-connecting rod 121 at the desired state.

The handle unit 4 includes a front fork 41 connected to the front member 13 of the frame body 1 and is rotatable about an axis (L), and a handle member 42 connected to a top end of the front fork 41.

In this embodiment, the wheel unit 5 includes a front wheel 51 mounted rotatably to the front fork 41 of the handle unit 4, a connecting member 52 disposed between rear ends of the dock portions 114 of the lateral rods 111, two rear wheels 53 mounted rotatably to the main member 11 of the frame body 1 and away from the front wheel 51, and a positioning member 54 securing separably the connecting member 52 to the lateral rods 111.

The brake unit 6 includes a brake component 61 mounted to the main member 11 of the frame body 1 and adjacent to the rear wheels 53, a control component 62 connected to the handle member 42, and a brake cable 63 connected between the brake component 61 and the control component 62.

Figure 4:
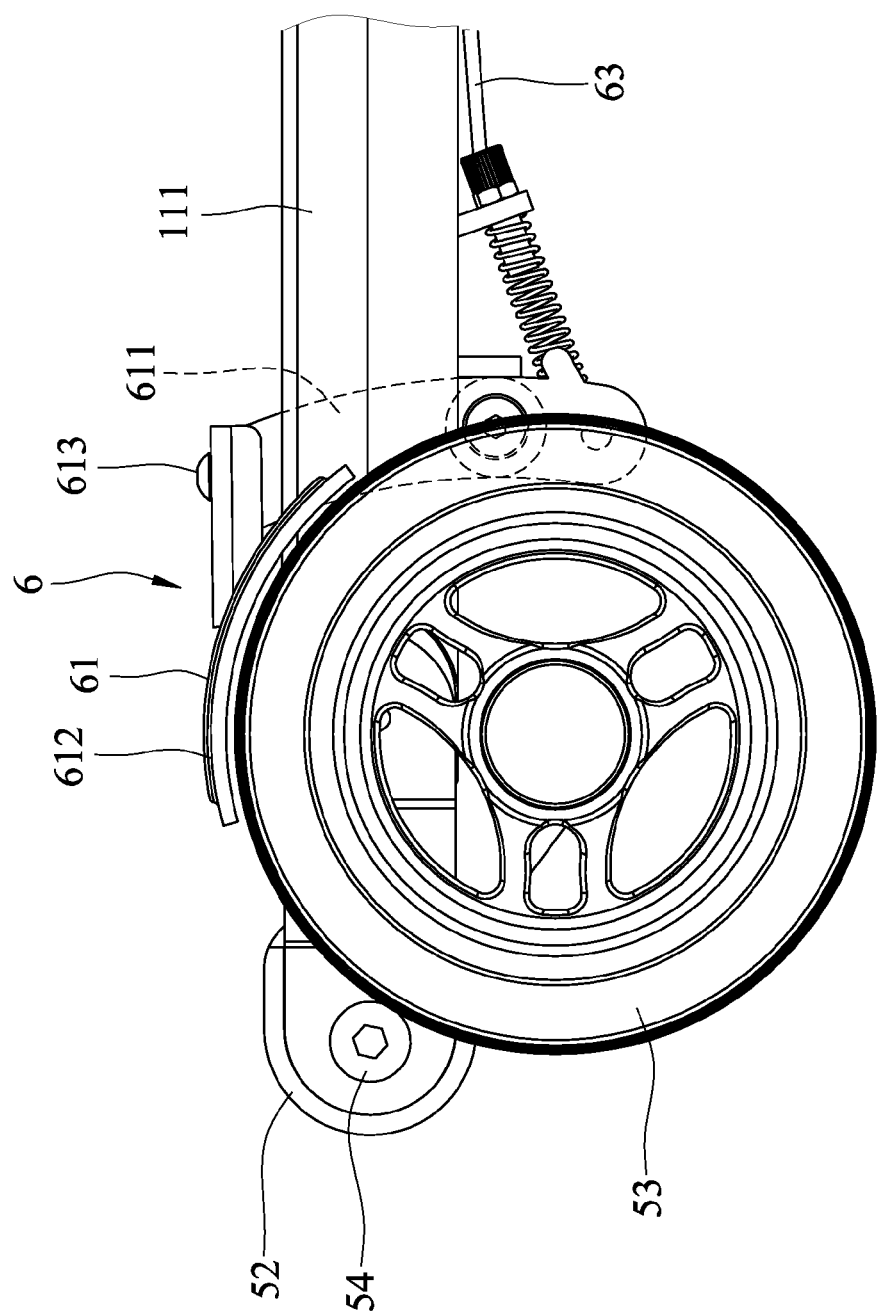
FIG. 4 is a fragmentary side view of the preferred embodiment with a brake component in a release position.
Figure 5:
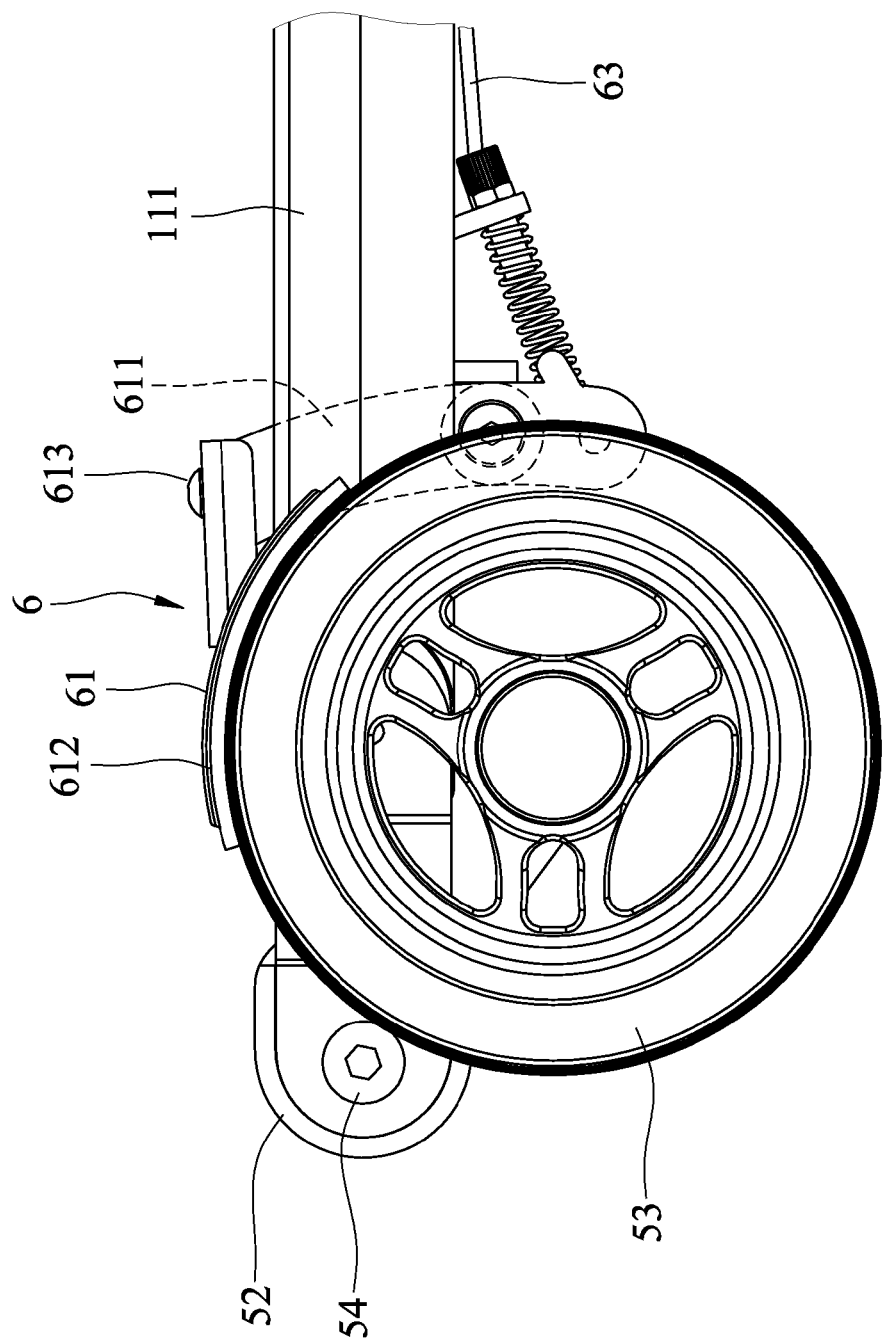
FIG. 5 is a fragmentary side view of the preferred embodiment with the brake component in a brake position.
Figure 6:
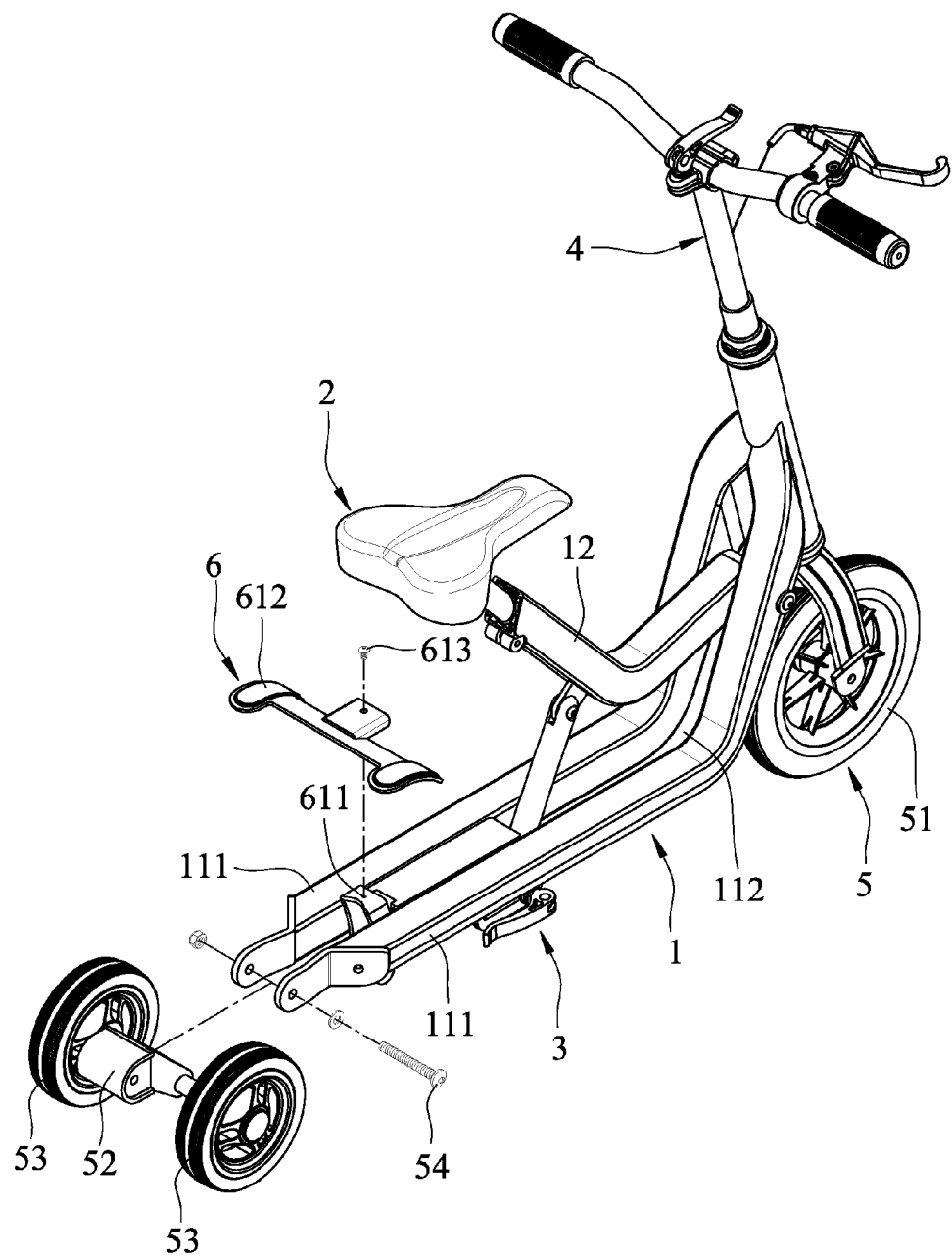
FIG. 6 is a partly exploded perspective view of the preferred embodiment.

Referring further to FIGS. 4 to 6, the brake component 61 has a main segment 611, an extending segment 612, and a securing segment 613. The main segment 611 is connected pivotally between the lateral rods 111. The extending segment 612 is connected to the main segment 611 adjacent to the rear wheels 53. The securing segment 613 is disposed for securing separably the extending segment 612 to the main segment 611.

The control component 62 controls movement of the brake component 61 via the brake cable 63 between a brake position (see FIG. 5) and a release position (see FIG. 4). At the brake position, the extending segment 612 of the brake component 61 abuts against the rear wheels 53, thereby restrain rotation of the rear wheels 53. At the release position, the brake component 61 is separated from the rear wheels 53, thereby allowing the rear wheels 53 to rotate.

According to the present invention, see FIGS. 3 and 6, when the seat-connecting rod 121 is in the expanded position, a seat 2 can be attached to the rear end 124 of the seat-connecting rod 121, so that a user can sit on the seat 2 and kick the floor to drive movement of the scooter (i.e., the scooter serves as a balance bike). When the scooter is in motion, the user can rest his/her feet respectively on the connecting portions 113 of the lateral rods 111 for a more comfortable posture. Furthermore, the user can operate the control component 62 of the brake unit 6 to control the speed of the scooter.

When the seat 2 is removed and the seat-connecting rod 121 is in the retracted position (see FIG. 1), the user can stand on the dock portions 114 of the lateral rods 111 and kick the floor to drive movement of the scooter (i.e., the scooter serves as a kick scooter).

Figure 7:
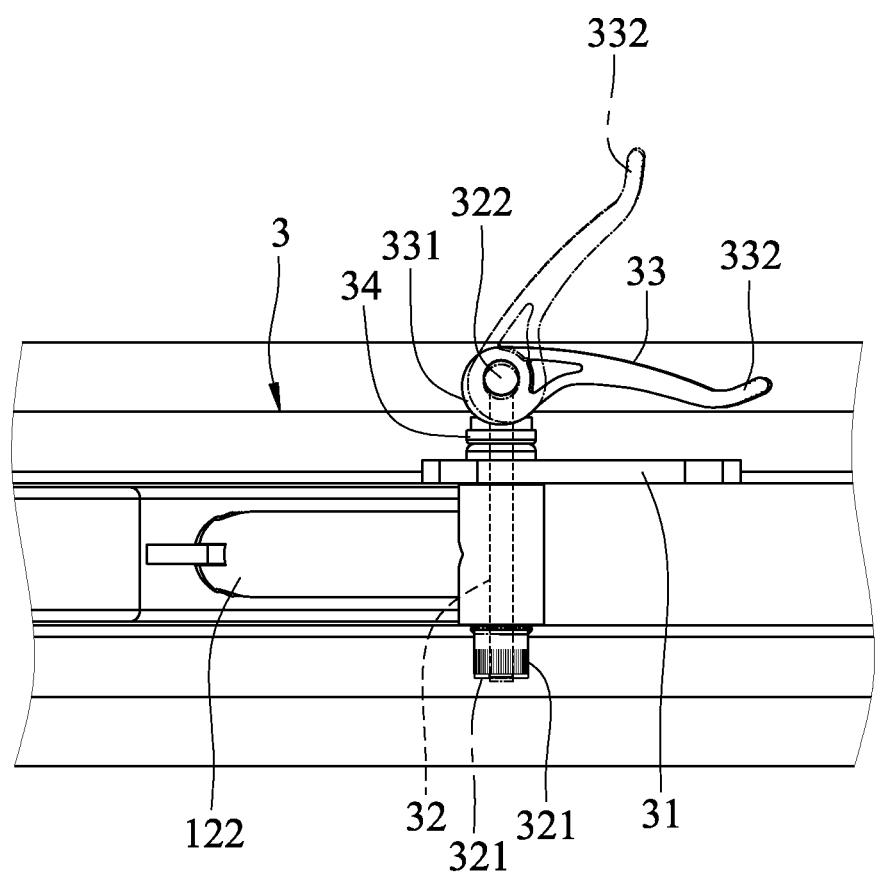
FIG. 7 is a fragmentary bottom view illustrating operation of a locking unit of the preferred embodiment.
Figure 8:
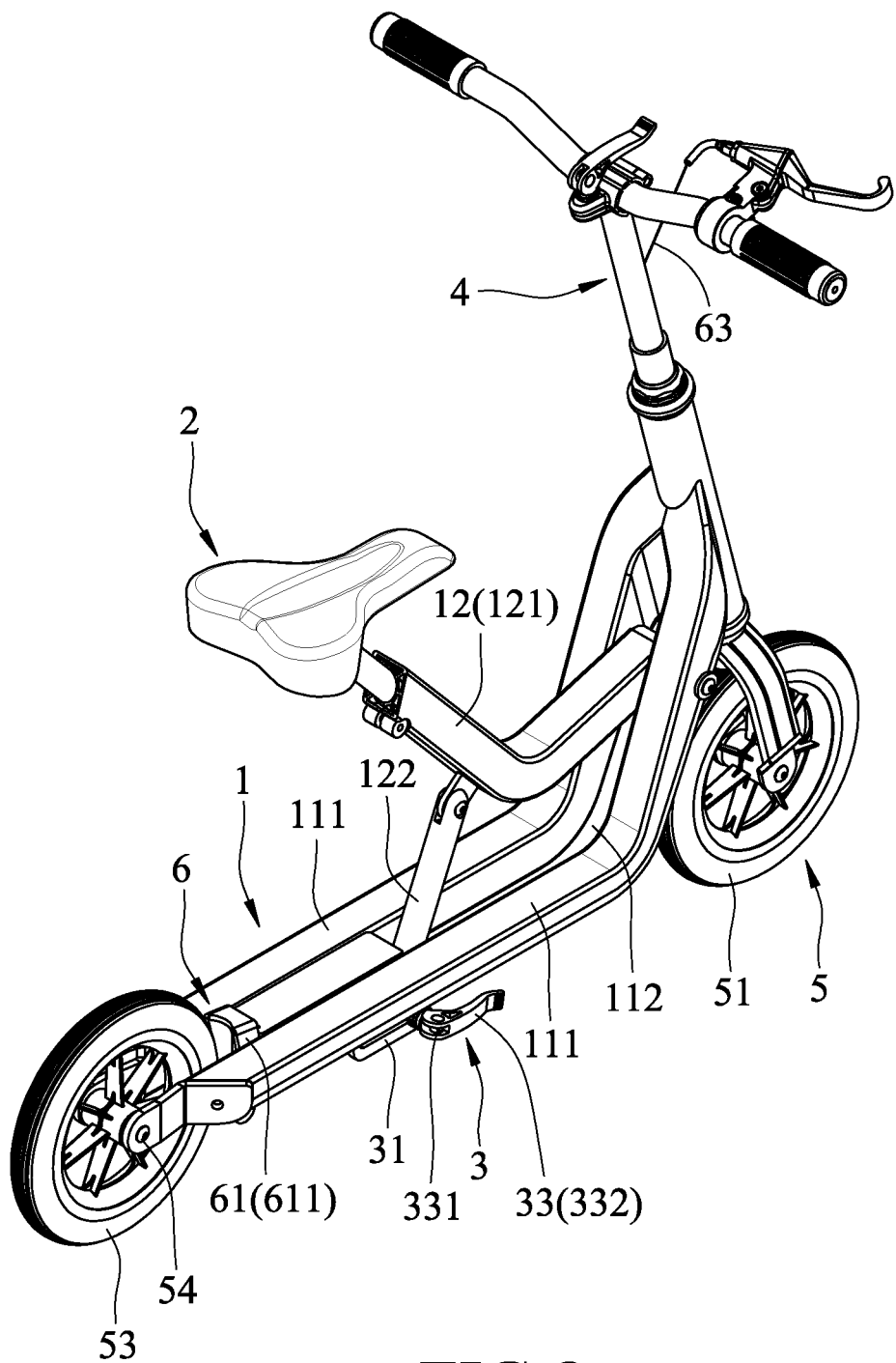
FIG. 8 is a perspective view of a modification of the preferred embodiment.

FIG. 7 discloses a modification of the preferred embodiment, in which the extending segment 612 (see FIG. 1) and the securing segment 613 (see FIG. 1) of the brake component 61 is omitted, and the wheel unit 5 includes only one rear wheel 53. When the brake component 61 is in the brake position, the main segment 611 of the brake component 61 abuts directly against the rear wheel 53 for restraining rotation of the rear wheel 53.

To sum up, the scooter of the present invention has the advantage of reducing the cost of purchasing two separate equipments and of having minimized storage space.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A scooter comprising:
   a frame body including
     a main member that is formed with an accommodating space;
     a seat-connecting rod that has a front end connected pivotally to said main member, and a rear end opposite to said front end, said seat-connecting rod being pivotable relative to said main member between a retracted position to be accommodated in said accommodating space, and an expanded position, where said rear end of said seat-connecting rod is away from said accommodating space and is adapted to be coupled to a seat;
     a front member that is connected to a front end of said main member;
   a handle unit including a front fork that is rotatably connected to said front member of said frame body, and a handle member that is connected to a top end of said front fork;
   a wheel unit including a front wheel that is mounted rotatably to said front fork of said handle unit, and at least one rear wheel that is mounted rotatably to said main member of said frame body and that is away from said front wheel; and
   a brake component mounted to said main member of said frame body, adjacent to said at least one rear wheel, and movable between a brake position for abutting against said at least one rear wheel, and a release position to be separated from said at least one rear wheel;
   wherein said frame body further includes a support rod that is connected pivotally between said main member and said seat-connecting rod, that is accommodated in said accommodating space when said seat-connecting rod is at the retracted position, and that supports said seat-connecting rod when said seat-connecting rod is at the expanded position; and
   wherein said main member of said frame body includes a pair of lateral rods connected to said front member and defining said accommodating space therebetween.

2. The scooter as claimed in claim 1, wherein said wheel unit includes two of said rear wheels, said wheel unit further including a connecting member that is disposed between said lateral rods, and a positioning member that secures separably said connecting member to said lateral rods.

3. The scooter as claimed in claim 2, wherein said brake component has:
   a main segment that is connected pivotally between said lateral rods of said main member of said frame body;
   an extending segment that is connected to said main segment, that is adjacent to said rear wheels, and that abuts against said rear wheels when said brake component is at the brake position; and
   a securing segment that is disposed for securing separably said extending segment to said main segment.

4. The scooter as claimed in claim 1, wherein each of said lateral rods has a connecting portion that extends downwardly and rearwardly from said front member, and a deck portion that extends rearwardly from a distal end of said connecting portion.

5. The scooter as claimed in claim 1, further comprising a locking unit mounted to said frame body for locking said seat-connecting rod at one of the retracted position and the expanded position.

6. The scooter as claimed in claim 5, wherein said locking unit includes:
- a locking component mounted to one of said lateral rods and formed with an engaging groove;
- a pivot rod extending through said engaging groove and connected pivotally to said support rod; and
- a pull rod connected to said pivot rod, disposed adjacent to said locking component, and being pivotable to tighten said pivot rod so as to lock said seat-connecting rod at the one of the retracted position and the expanded position.

7. The scooter as claimed in claim 6, wherein:
said locking unit further includes a washer disposed between said locking component and said pull rod;
said pivot rod has a locking section connected pivotally to said support rod, and a coupling section extending through said engaging groove; and
said pull rod has a cam portion connected to said coupling section of said pivot rod, and an access portion distal from said cam portion, said pull rod being pivotable relative to said pivot rod between a locking position, where said access portion is close to said locking component and where said cam portion tightly presses said washer to abut against said locking component so as to tighten said pivot rod, and an unlocking position, where said access portion is away from said locking component and where said cam portion releases said washer.

8. The scooter as claimed in claim 1, further comprising a control component connected to said handle member for controlling movement of said brake component between the brake position and the release position.

\* \* \* \* \*